Figure 1:
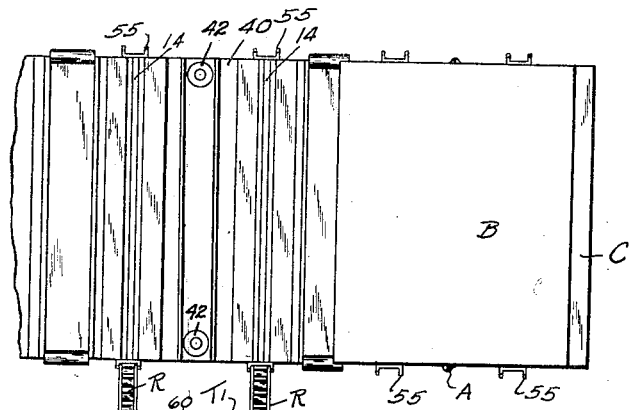

Feb. 23, 1937.  B. F. FITCH  2,071,335
APPARATUS FOR TRANSFERRING MOVABLE CONTAINERS
Filed Dec. 17, 1934  3 Sheets-Sheet 1

Inventor
Benjamin F. Fitch,
By Bates, Golrick & Fears
Attorneys

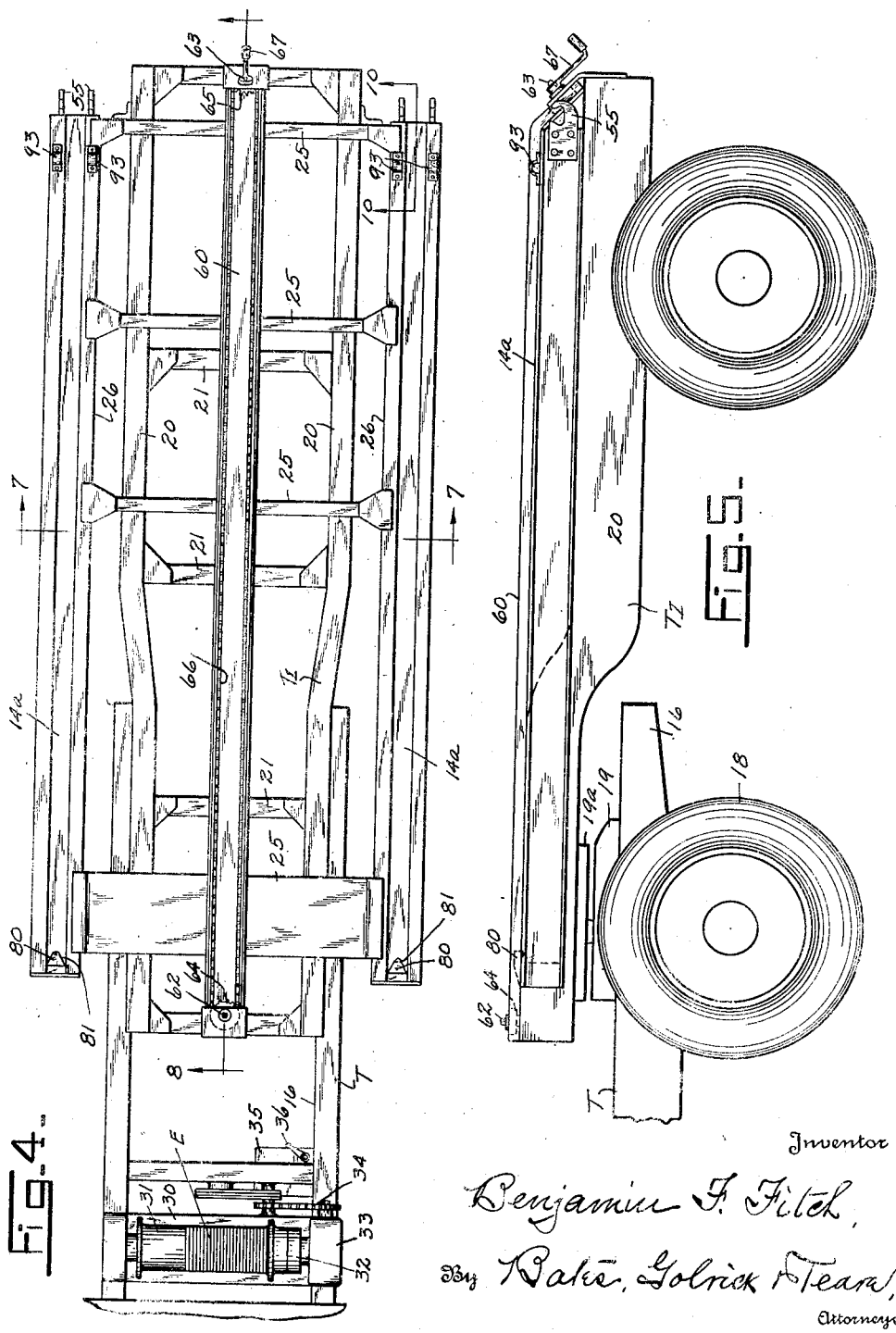

Feb. 23, 1937.  B. F. FITCH  2,071,335
APPARATUS FOR TRANSFERRING MOVABLE CONTAINERS
Filed Dec. 17, 1934  3 Sheets-Sheet 3
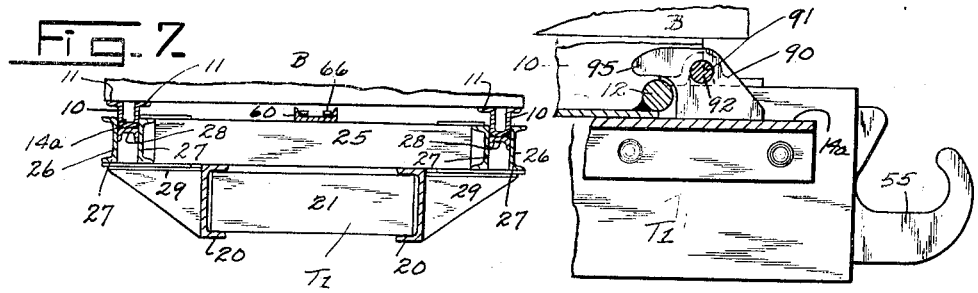
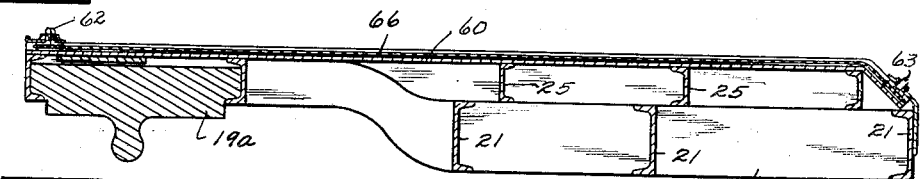
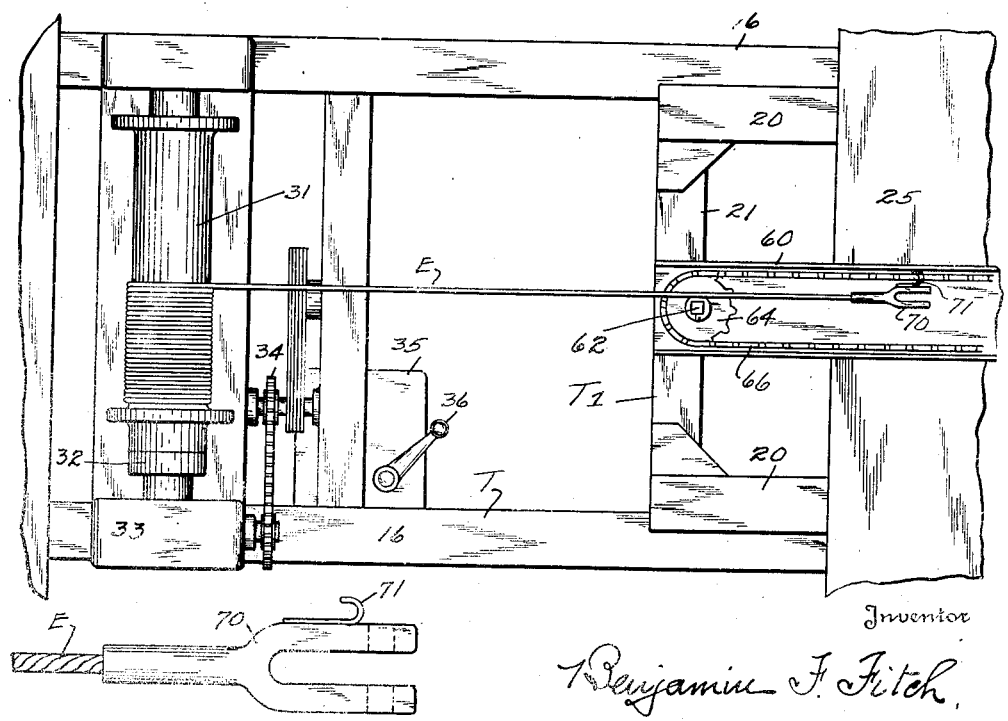

Patented Feb. 23, 1937

2,071,335

UNITED STATES PATENT OFFICE 2,071,335

APPARATUS FOR TRANSFERRING MOVABLE CONTAINERS

Benjamin F. Fitch, Greenwich, Conn., assignor to Motor Terminals Company, New York, N. Y., a corporation of Delaware Application December 17, 1934, Serial No. 757,833

13 Claims. (Cl. 214—38)

This invention relates to an apparatus for transferring demountable freight containers, and especially to a mechanism for transferring movable containers in which freight is stored, and thereafter handled as a unit while being transferred from automotive truck to a railway car or shipper's platform, or vice versa. I have heretofore employed with great advantage overhead traveling cranes for raising and transferring such containers from a truck to a platform or to a railway car. However, it is sometimes desirable to supplement the crane handling of demountable containers by a system which eliminates the expense of crane installation at certain points of interchange, such as, for instance, at a small shipper's platform, where only an occasional container is to be handled. Under such circumstances I prefer to arrange the containers and the carriers so that the body may be slid from the car or platform to the vehicle, or vice versa. Such a system for handling freight containers is described and illustrated in my copending application for Letters Patent, Serial No. 755,752, filed in the United States Patent Office on the 3rd day of December, 1934.

When it is desirable to supplement the crane handling system with other methods of transfer, I prefer to provide the container and the carriers with coacting members to guide the container, for sliding movement, from one surface to another, and I prefer to uitlize the power mechanism of an automotive tractor for operating a cable-winding mechanism which is so arranged that the cable may be used to draw the container either from the truck to the car or platform or vice-versa.

In such systems, due to highway rules and regulations, it becomes highly advantageous to construct both the trailer and the container of maximum size. Hence, to facilitate the sliding of the container from the truck or trailer it likewise becomes advantageous to mount the cable winding drum forwardly on the truck or trailer relative to the body. In such instances, in order that the container may be drawn from the truck to a car or platform, without an undue amount of equipment, I prefer to arrange the truck or trailer so that the cable may pass from the winding drum, between the bottom of the container and the supporting surface of the truck or trailer frame, to the platform or car, where it is wrapped around a suitable sheave mounted on the platform or car and then returned and secured to the container. Obviously, some difficulty may be encountered in feeding the cable from the winding drum, beneath the body to the car. An object of the present invention, therefore, is to facilitate such feeding of the cable, and I prefer to accomplish this object without necessitating the operator crawling beneath the truck or trailer.

It is a more specific object of the present invention to provide the truck or trailer with a mechanism to which the truck operator may attach the cable and which will draw the cable from the winding drum and feed it beneath the container to a position at the rearmost end thereof, where it may be readily grasped by the operator and drawn around the sheave, carried by the platform or car, and readily returned to be placed in engagement with the container.

Another object of this invention is to provide the carrier with a simple form of locking mechanism to restrain the body or container against movement when in transit on the carrier. To accomplish this I prefer to utilize hook members carried by the carrier guides and arranged to engage the body or container guide. One such member is preferably permanently secured to the carrier and so arranged that as the container is slid into position on the carrier, it will slide into contact with such member, and thereafter a second member may be positioned at the other end of the container and removably secured to the carrier in position to clamp the container to the carrier between the two members.

Other objects of the present invention will become more apparent from the following description, reference being had to the accompanying drawings, which illustrate a preferred embodiment of the invention. The essential features of the invention will be fully set forth in the claims.

Figure 2:
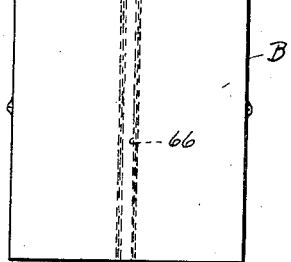
Figure 2:
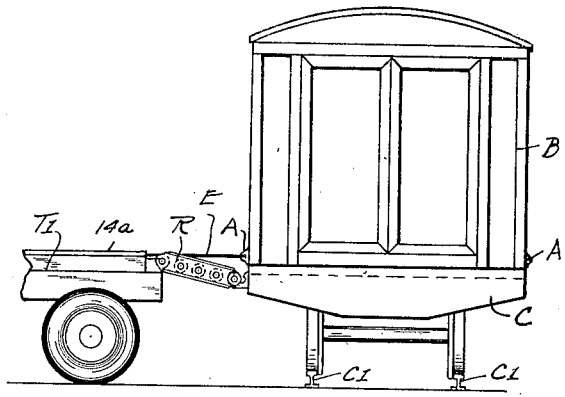
Figure 3:
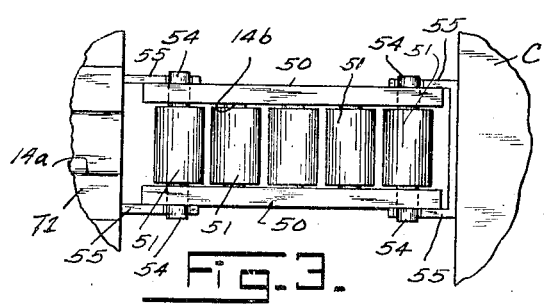

Referring now to the drawings, Fig. 1 is a plan view, illustrating an automotive vehicle in position adjacent the railway car, and having a demountable freight container thereon, which is to be deposited on the car; Fig. 2 is a fragmentary elevation, illustrating an automotive vehicle positioned to receive a container from a railway car; Fig. 3 is a plan on an enlarged scale of a ramp mechanism which is interconnected between the car and the automotive vehicle to facilitate the sliding of the container from one carrier to the other; Fig. 4 is an enlarged fragmentary plan of a truck and trailer; Fig. 5 is a fragmentary side elevation of the truck and trailer unit illustrated in Fig. 4; Fig. 6 is an enlarged fragmentary plan of a portion of the truck and trailer unit shown in Fig. 4 and illustrating the method of feeding the cable toward the rear of the vehicle; Figs. 7 and 8 are vertical sections, as indicated by the lines 7—7 and 8—8, respectively, on Fig. 4; Fig. 9 is a detail of a hook mechanism for attaching the cable to the cable feeding mechanism and to the container; Fig. 10 is an enlarged sectional detail illustrating a locking mechanism for securing the container in position on the truck, the plane of the section being indicated by the line 10—10 on Fig. 4.

As heretofore mentioned, this invention is especially adapted for use in a system of transferring freight containers which contemplates the sliding or skidding of a removable container between a truck or trailer and a railway car or platform. As shown in Fig. 1, I have illustrated a railway car C supported by rails C1 of the usual roadbed, adjacent to and normal with the car is an automotive carrier having a removable container or body B mounted thereon. As shown, the automotive carrier comprises a truck or tractor T, which draws a detachable trailer T1. The truck unit has previously been positioned adjacent to the railway car and bridge members or ramps R hereinafter to be described, have been interconnected between the trailer and the car.

The body B is skidded from the trailer T1 across the ramp R into position on the flat car by a suitable power mechanism carried by the truck and operatively connected to cable winding drums on the tractor chassis. The cables carried by such drums are passed beneath the container to the far side of the car, where they pass around sheaves carried by the car and are returned to be secured to the container as at A. Thus the power of the truck will be utilized to draw the body from the car into position on the trailer. Such a system of transferring freight has been described, illustrated and claimed in my copending application for Letters Patent heretofore mentioned.

The body B comprises a rectangular container having side and end walls supported by a suitable frame. Rigidly secured to the bottom of the frame and extending downwardly across the body are a series of inverted rails 10. As shown in Figs. 7 and 10, each rail comprises a flat bottomed inverted pressed metal U having flanges 11 which are secured in any suitable manner to the body rails and are arranged to slide in channels or guideways 14, carried by the car, and similar guideways 14a on the automotive carrier. The guides 14 and 14a serve to guide and maintain the body in proper position on the carrier and provide surfaces which may be greased in the usual manner to eliminate, to a certain degree, the friction between the container rails and the carrier.

I will first describe in detail the truck and trailer as illustrated in the drawings, and especially with reference to Figs. 1 to 8, inclusive. As there shown, the truck proper comprises the usual motor and cab unit 15, mounted on a chassis frame 16, supported by suitable dirigible forward wheels (not shown) and suitable rear driving wheels 18 (Fig. 5). The truck chassis carries one member of a trailer connecting device 19, the other member of which is detachable therefrom and carried by the trailer T1.

The trailer T1 comprises the usual longitudinal chassis members 20, which are connected together by suitable cross frame members 21, and adjacent their forward ends carry the trailer connecting device member 19a, which connects the trailer with the truck or tractor.

While I have illustrated a combined tractor and trailer unit, wherein the trailer may be detached from the tractor, as desired by the operator, it is obvious that I may employ a single automotive unit, such as the usual truck, or I may employ a four-wheeled trailer arranged to be drawn from place to place in the usual manner by a suitable tractor truck.

The channels or guides 14a are as heretofore mentioned carried by the trailer. Supported by the chassis frame 20 and extending transversely thereof are a series of frame members 25, at the ends of which are secured girder-like constructions 26. The girders 26 each comprise a pair of oppositely faced channel members 27, secured together and spaced apart by a suitable channel 28, forming, in the upper portion of the girder member, a longitudinal guideway 14a of the truck, heretofore mentioned. Suitable bracing, such as gusset plates 29, and other bracings not shown, act to firmly support the girder member 26 on the trailer chassis.

Mounted on the truck frame immediately to the rear of the cab 15 is a cable-winding unit 30, which, as shown in Fig. 4, comprises a winding drum 31 mounted in suitable bearings and is provided with a brake mechanism generally indicated at 32. The brake mechanism is not shown in detail, but may be of any well-known type. The winding drum is driven through a worm gear unit enclosed within a housing 33 and operatively connected by suitable driving mechanism 34 to a transmission 35, which receives its power from the motor power unit of the truck in the usual manner. The transmission 35 is provided with a suitable hand lever 36 to enable the operator to readily control the cable-winding drum.

The railway car C is of the type illustrated in my copending application, heretofore mentioned, and comprises in general a platform 40 having a series of transversely extending channel shaped guideways 14, arranged to align with the guideways of the trailer T1. Intermediate each pair of guideways 14 a channel-like depression is formed in the car floor, carrying at its outer ends a sheave 42 around certain of which the cables may be passed to draw the container from the truck or trailer to the car.

The interconnecting ramp members are best shown in Figs. 1, 2 and 3. As there shown, they comprise a pair of frame members 50, spaced apart in any suitable manner. Mounted between the ramp frame members 50 are a series of anti-friction rollers 51, the upper surfaces of which are, as shown in Fig. 2, slightly below the upper surfaces of the frame members 50, thereby providing a guideway 14b which, when the ramp members are connected between the trailer and the railway car, form a continuation of the guideways 14 and 14a. The shafts which support the endmost rollers 51 of the ramp R extend some distance beyond the outer edges of the frame members 50, as shown in Fig. 3 at 54, and are arranged to engage suitable hook members 55 which are secured both to the sides of the railway car and to the end of the truck, thereby permitting the ramp members to be readily positioned between the car and the truck.

When it is desired to transfer the body or container from the car or platform to the truck, or vice versa, the cable E, which is normally wound on the winding drum 31, is drawn therefrom by the operator and passed along the truck chassis, either to the container on the car floor or around the sheaves of the car floor and back to the container, depending upon where the container is positioned. It is obvious that it may at times be difficult to draw the cable the length of the trailer. This is especially true when the body B is on the trailer and it is desired to transfer it to the car, as in such instances, the cable must be passed beneath the body and above the truck chassis. While the truck operator may accomplish this by crawling beneath the truck and inserting the cable over the various transverse chassis and frame members 21 and 25, this might involve some difficulty and would require an undesirable amount of time. Hence, I provide a mechanism which will facilitate the transfer of the cable from the winding drum to the car.

As shown in Fig. 4, I have provided the trailer frame with a centrally located channel member 60, which extends longitudinally of the trailer, as shown in Fig. 1, some distance forwardly and rearwardly of the body B. Mounted in suitable pivots or shafts 62 and 63 at the forward and rearmost ends of the channels 60 are sprockets 64 and 65, respectively, which are connected together by a continuous chain 66.

The cable E is provided, as shown at Fig. 9, with a clevis 70, arranged to receive a pin to connect the cable with the connecting device A carried by the container. Secured to this clevis 70 is a small hook 71, arranged to be inserted in, or secured to, the links of the chain 66 by the operator of the truck.

When the operator desires to draw the cable from the winding drum to the car, he merely unreels sufficient cable to attach the hook members 71 to the foremost end of the chain 66, and then proceeding to the rear portion of the trailer, positions a suitable crank 67 on the squared upper end of the shaft 63, rotates such shaft, together with the sprocket 65, thereby progressing the chain 66 in a direction to draw the cable toward the rear end of the trailer. The sprocket 65 is positioned on a downwardly inclined portion of the guideway or channel 60, so that it will be in a convenient position for the truck operator. When the chain 66 has drawn the cable end to the sprocket 65, the operator removes the cable from the chain 66 and thereupon manually draws it across the car, around the sheave 42 thereon, and secures it to the body B on the trailer. This obviously facilitates the attaching of the cable to the body and decreases the time required to make the transfer.

After the container has been positioned on the car, the truck operator merely causes the winding drum 31 to reeve the cable again on the winding drum, and when fully wound the clevis 70 may be secured to the drum in the usual manner, to prevent inadvertent unreeling of the cable.

When a container is being slid from the car or platform onto the trailer, the hollow rails 10 thereof are drawn into contact with duck-bill or hook-like members 80, which are secured in the channels 14a of the truck adjacent their forward ends. Such members are bevelled, as shown in Fig. 4, at 81, to align the body sidewise on the trailer, and are provided with hook-like extensions, as shown at 95 in Fig. 10, to engage rods 12, which are secured by welding or other suitable means to the container rails, thereby preventing vertical movement of the container in the guideway.

When the container has been completely moved onto the truck into engagement with the forward retaining devices, suitable removable retaining devices 90 are positioned in the channels 14a adjacent the rod 12 of the container rails at the rearmost end thereof. As shown, such devices are similar to the retaining devices 80, heretofore described. However, the retaining devices 90 are removably secured to the trailer frame.

As shown, each retaining device 90 is provided with an opening 91, arranged to engage a pin 92, which passes through suitable brackets 93 mounted at either side of the channels 14a of the truck, thereby holding the retaining devices 90 in engagement with the body rails, thus preventing inadvertent displacement of the body.

It will be seen that the cable transferring mechanism of this invention is very simple and adds comparatively little weight or mechanism to the truck and trailer equipment. The mere manual connection of the cable end to the flexible loop allows the operator to immediately transfer such cable end to the rear of the trailer where it may be readily placed manually about the distant sheave and returned for attachment to the demountable body. The removal of the pins which hold the rearmost locking devices then enables the power mechanism on the truck to draw the body off of the trailer. When by a reverse action of the cable drum the body is drawn onto the trailer and reaches its final position thereon, it automatically engages the foremost locking devices, and then the manual replacement of the rear locking devices with their pins completes the anchorage to the trailer.

Reference is made to my copending application Ser. No. 755,752, already mentioned, and to its division Ser. No. 32,029, filed July 18, 1935, for claims on any features of the complete apparatus herein illustrated other than the cable feeding mechanism of this application.

I claim:

1. The combination of a vehicle, a demountable body positioned on the vehicle and adapted to be moved therefrom to another supporting surface by a horizontal movement, a cable winding mechanism on the vehicle including a drum and a cable thereon having its free end adapted for attachment to the body and means to feed the free end of the cable from the winding mechanism to a position beyond the body.

2. The combination of a truck, a demountable body positioned on the truck and adapted to be moved therefrom to another supporting surface by a sliding movement, a cable winding mechanism on the truck, a cable having a free end extending from said mechanism, a cable guide on the truck, and means to feed the free end of the cable from the winding mechanism along the guide.

3. The combination of a vehicle, a demountable body positioned on the vehicle and adapted to be moved therefrom to a supporting surface by a horizontal movement, a cable winding mechanism on the vehicle at one end of the positioned body, a guideway on the vehicle beneath the body and means mounted in the guideway and adapted to feed the free end of a cable from the winding mechanism through the guideway to the other end of the body.

4. The combination of a truck, a railway car, a demountable body, cooperating guides on the body, the truck and the car, cable winding mechanism at one end of the truck having a cable attached thereto at one end, means to progress the unattached end of the cable from the winding mechanism to the other end of the truck, and a sheave on the car whereby the body may be skidded from the truck to the car by means of said cable.

5. The combination of a truck, a load supporting surface on the truck, a cable winding drum on the truck at one end of said surface, and means mounted on the truck for reciprocation in a substantially fixed path to feed an unattached end of a cable from the drum to the other end of said load supporting surface.

6. The combination of a vehicle having a load supporting surface, a cable winding mechanism on the vehicle, a guideway on the vehicle, and a manually operable means mounted on the vehicle and adapted to feed a cable from the winding mechanism through the guideway.

7. The combination of a truck having a load supporting surface, a cable winding mechanism at one end of said surface, and means independent of the winding mechanism and including a continuous loop and guides for opposite end portions thereof for feeding the cable from the winding mechanism to the other end of the load supporting surface.

8. The combination of a truck having a load supporting surface, a cable winding mechanism on the truck, a horizontal guideway on the truck, an endless loop mounted in said guideway and adapted to have temporarily attached to it the free end of a cable from the winding mechanism, and mechanism for moving the endless loop to progress the cable along the guideway.

9. The combination of a truck, a cable winding mechanism thereon, a guideway extending longitudinally of the truck, a rotatable member mounted on said guideway at each end thereof, a continuous flexible member looped around said rotatable members, means to connect the cable to said flexible member, means whereby one of said rotatable members may be operated to progress the cable from the winding mechanism to the opposite end of the truck.

10. The combination of a truck, parallel guides thereon adapted to guide a load to and from the truck, a cable winding mechanism on the truck having a cable with a free end adapted to engage a load, a guide on the truck for the cable, and means to progress the free end of the cable from the winding mechanism along the cable guide so that it may pass beyond a body resting on the first-mentioned guides.

11. The combination of a truck, a pair of longitudinal guideways thereon, a demountable body having guides adapted to coact with the guideways, an endless loop mounted on the truck, cable winding mechanism on the truck, a cable leading therefrom and adapted to be connected at its end temporarily to one of the reaches of the loop, means for operating said loop to progress the cable, whereby the cable may be passed beneath a demountable body on the truck and be passed about a sheave when utilized for drawing the body off the truck.

12. The combination of a vehicle, a demountable body on the vehicle, a cable winding mechanism on the vehicle, means independent of said mechanism and disposed between the body and the vehicle, said means being arranged to travel back and forth and to feed a cable from the winding mechanism to a position beyond the body in a direction away from said mechanism.

13. The combination of a truck, a load transferring mechanism carried intermediate the ends of the truck and including a flexible member having a free portion adapted to be extended from said mechainsm to the end of the truck, a second flexible member mounted on the truck and adapted to extend the free portion of the first-named flexible member and means to freely engage and disengage said two flexible members.

BENJAMIN F. FITCH.